United States Patent
Park et al.

(10) Patent No.: US 8,971,626 B1
(45) Date of Patent: Mar. 3, 2015

(54) SYSTEMS, METHODS, AND ARTICLES OF MANUFACTURE FOR GENERATING AN EQUALIZED IMAGE USING SIGNATURE STANDARDIZATION FROM WEIBULL SPACE

(71) Applicant: The United States of America as Represented by the Secretary of the Navy, Washington, DC (US)

(72) Inventors: Alden Eugene Park, Ridgecrest, CA (US); Brent James Sundheimer, Ridgecrest, CA (US)

(73) Assignee: The United States of America as Represented by the Secretary of the Navy, Washington, DC (US)

( * ) Notice: Subject to any disclaimer, the term of this patent is extended or adjusted under 35 U.S.C. 154(b) by 112 days.

(21) Appl. No.: 13/911,889

(22) Filed: Jun. 6, 2013

(51) Int. Cl.
*G06K 9/00* (2006.01)
*G06T 5/40* (2006.01)

(52) U.S. Cl.
CPC .................................. *G06T 5/40* (2013.01)
USPC .......................................................... 382/169

(58) Field of Classification Search
CPC ....... G06K 9/40; H04N 5/57; H04N 21/4318; H04N 21/44008; G06T 7/0083; G06T 7/0087; G06T 7/401; G06T 2207/20136
See application file for complete search history.

(56) References Cited

U.S. PATENT DOCUMENTS

| 7,277,847 | B2 * | 10/2007 | Berger | 704/211 |
| 8,121,431 | B2 * | 2/2012 | Hwang et al. | 382/266 |
| 8,698,961 | B2 * | 4/2014 | Astrachan | 348/672 |
| 8,897,588 | B2 * | 11/2014 | Wang et al. | 382/255 |

* cited by examiner

*Primary Examiner* — Jose Couso
(74) *Attorney, Agent, or Firm* — Christopher L. Blackburn; James M. Saunders

(57) ABSTRACT

Systems, articles of manufacture, and methods for generating an equalized image using properties of the two-dimensional Weibull distribution.

8 Claims, 6 Drawing Sheets sorteddata= {10  15  20  20  29  29  37  40  40  42  45  49  51  55  56  56 58  59  61  61 69  69  71
72  76  77  78  79  81  83  83  84  85  85  85  86  86  90  90  91  92  97  97  97  98
101  102  104  104  105  107  108  109  111  112  114  115  115  116  117  118  119  121  122
123  123  123  124  125  125  126  127  127  128  131  132  137  141  142  143  146  147  151
151  152  153  161  166  167  169  172  174  176  183  186  187  300  400  500  510]

FIGURE 6

| 123 | 113 | 113 | 113 | 151 | 113 | 113 | 113 | 113 | 113 |
|---|---|---|---|---|---|---|---|---|---|
| 113 | 113 | 113 | 113 | 113 | 123 | 113 | 113 | 169 | 113 |
| 113 | 113 | 153 | 113 | 113 | 113 | 127 | 113 | 113 | 113 |
| 113 | 113 | 113 | 117 | 113 | 113 | 113 | 113 | 113 | 115 |
| 113 | 113 | 113 | 289 | 113 | 113 | 113 | 113 | 113 | 113 |
| 132 | 113 | 114 | 115 | 116 | 118 | 113 | 113 | 119 | 121 |
| 122 | 113 | 123 | 113 | 113 | 124 | 125 | 125 | 126 | 127 |
| 113 | 128 | 131 | 137 | 141 | 113 | 142 | 143 | 146 | 147 |
| 113 | 113 | 151 | 113 | 152 | 161 | 166 | 167 | 172 | 174 |
| 176 | 183 | 186 | 187 | 289 | 113 | 113 | 113 | 289 | 289 |

FIGURE 7

$$\begin{bmatrix}
136 & 0 & 0 & 0 & 329 & 0 & 0 & 0 & 0 & 0 \\
0 & 0 & 0 & 0 & 0 & 136 & 0 & 0 & 397 & 0 \\
0 & 0 & 352 & 0 & 0 & 0 & 204 & 0 & 0 & 0 \\
0 & 0 & 0 & 56 & 0 & 0 & 0 & 0 & 0 & 34 \\
0 & 0 & 0 & 511 & 0 & 0 & 0 & 0 & 0 & 0 \\
132 & 0 & 11 & 34 & 45 & 68 & 0 & 0 & 79 & 90 \\
102 & 0 & 136 & 0 & 0 & 306 & 170 & 170 & 181 & 204 \\
0 & 215 & 227 & 249 & 261 & 0 & 272 & 283 & 295 & 306 \\
0 & 0 & 329 & 0 & 340 & 363 & 374 & 386 & 408 & 420 \\
431 & 442 & 454 & 465 & 511 & 0 & 0 & 0 & 511 & 511
\end{bmatrix}$$

FIGURE 8

SYSTEMS, METHODS, AND ARTICLES OF MANUFACTURE FOR GENERATING AN EQUALIZED IMAGE USING SIGNATURE STANDARDIZATION FROM WEIBULL SPACE

STATEMENT REGARDING FEDERALLY SPONSORED RESEARCH OR DEVELOPMENT

The invention described herein may be manufactured and used by or for the government of the United States of America for governmental purposes without the payment of any royalties thereon or therefor.

FIELD OF THE INVENTION

The invention generally relates to digital image processing, and, more particularly, to generating equalized images.

BRIEF DESCRIPTION OF THE DRAWINGS

FIG. 5 also illustrates the intersection point of the best line fits of the illustrative first and second amplitude regions in Weibull space, as well as the abscissa value of the illustrative intersection in Weibull space.

FIG. 6 is an example of a 'sorteddata' array for the illustrative input image of FIG. 2.

FIG. 7 is an intermediate image of the illustrative image in FIG. 2.

FIG. 8 depicts, via pixel intensity values, an equalized image of the illustrative image of FIG. 2.

It is to be understood that the foregoing and the following detailed description are illustrative and explanatory only and are not to be viewed as being restrictive of the invention, as claimed. Further advantages of this invention will be apparent after a review of the following detailed description of the disclosed embodiments, which are illustrated schematically in the accompanying drawings and in the appended claims.

DETAILED DESCRIPTION OF EMBODIMENTS OF THE INVENTION

Embodiments generate an equalized image from an input image. Operational flow of embodiments of systems and articles of manufacture is described with reference to the method, where each step in the method is performed by the system in system embodiments, or alternatively, included as an instruction stored on a non-transitory processor readable medium that, when executed by the system, causes the system to perform the step.

Figures 1, 2:
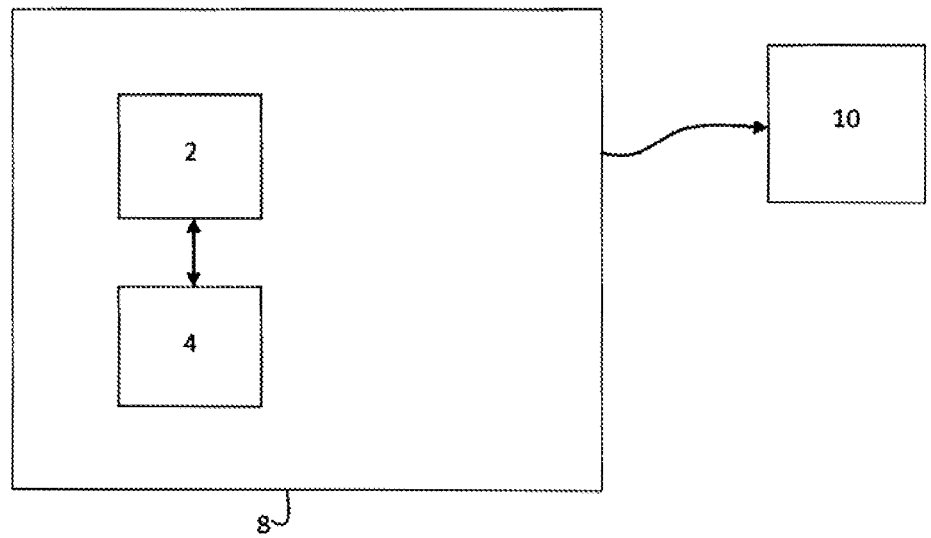
FIG. 1 illustrates components of some system and/or article of manufacture embodiments.
FIG. 2 depicts an illustrative 10×10 input image via the pixel intensity values of its pixels.

With reference to FIG. 1, system embodiments include a Central Processing Unit (CPU) 2 operatively associated with electronic memory 4. A CPU 2 is the hardware within a computer that carries out the instructions of a computer program by performing the basic arithmetical, logical, and input/output operations of the system. CPU 2 is operatively associated with memory 4, which includes data and stored instructions. The memory stores software (and input data such as the input image), which the CPU uses to perform the processes described herein. 8 designates a motherboard, to which the CPU and memory are electrically associated. 10 is a display monitor to display a visual depiction of the generated equalized image.

Article of manufacture embodiments are directed to non-transitory processor readable medium(s) having stored thereon processor executable instructions that, when executed by the processor(s), cause the processor to perform the process(es) described herein. The term non-transitory processor readable medium include one or more non-transitory processor-readable medium (devices, carriers, or media) having stored thereon a plurality of instructions, that, when executed by the electronic processor (typically a central processing unit—an electronic circuit which executes computer programs, containing a processing unit and a control unit), cause the processor to process/manipulate/act on data according to the plurality of instructions (defined herein using the process/function form). The non-transitory medium can be any non-transitory processor readable medium (media), including, for example, a magnetic storage media, "floppy disk", CD-ROM, RAM, a PROM, an EPROM, a FLASH-EPROM, any other memory chip or cartridge, a file server providing access to the programs via a network transmission line, holographic unit, etc. Of course, those skilled in the art will recognize that many modifications may be made to this configuration without departing from the scope. In some system embodiments, the electronic processor is co-located with the processor readable medium; in other system embodiments, the electronic processor is remotely located from the processor readable medium. It is noted that the steps/acts/processes described herein including the figures can be interpreted as representing data structures or sets of instructions for causing the computer readable medium to perform the step/act/process.

Input Image

An input image is a digital image of a physical scene digitally represented in an electronic data structure as data representing a collection of intensity values assigned to pixels that represent the image. In some embodiments, the image is a Radio Detection and Ranging (RADAR) image. Note that the description herein adopts a convention in which intensity values are expressed as an integer value within a range between a minimum and maximum; using this convention, the "possible pixel intensity values" are the integer values within the range between the minimum and maximum. So, for example, where an 8-bit grayscale image is the input image, the "possible pixel intensity values" could be all of the integers between and including 1 and 256.

Pixel Intensity Value

Each of the pixels that represents an image stored inside a computer has a pixel value ("pixel intensity value" or PIV) which describes how bright that pixel is, and/or what color it should be. In the simplest case of binary images, the pixel value is a 1-bit number indicating either foreground or background. For grayscale images, the pixel value is a single number that represents the brightness of the pixel. The most common pixel format is the byte image, where this number is stored as an 8-bit integer giving a range of possible pixel intensity values from 0 to 255. Typically zero is taken to be black, and 255 is taken to be white. Values in between make up the different shades of gray.

To represent color images, separate red, green and blue components must be specified for each pixel (assuming an RGB colorspace), and so the pixel 'value' is actually a vector of three numbers. Often the three different components are stored as three separate 'grayscale' images known as color planes (one for each of red, green and blue), which have to be recombined when displaying or processing. Multi-spectral images can contain even more than three components for each pixel, and by extension these are stored in the same kind of way, as a vector pixel value, or as separate color planes. The actual grayscale or color component intensities for each pixel may not actually be stored explicitly. Often, all that is stored for each pixel is an index into a colormap in which the actual intensity or colors can be looked up. If this approach is used then it is usually necessary to set up a colormap which relates particular ranges of pixel values to particular displayed colors.

Although simple 8-bit integers or vectors of 8-bit integers are the most common sorts of pixel values used, some image formats support different types of value, for instance 32-bit signed integers or floating point values. Such values are extremely useful in image processing as they allow processing to be carried out on the image where the resulting pixel values are not necessarily 8-bit integers.

Intensity Histogram

In an image processing context, the histogram of an image normally refers to a histogram of the pixel intensity values. This histogram can be thought of as a representation of the discrete probability density function; the histogram relates the number of pixels in an image at each of the intensity value of pixels found in that image, where the probability of a pixel in the image having a particular pixel intensity value is computed by dividing the histogram value for the particular pixel intensity value by the number of pixels in the image. For an 8-bit grayscale image there are 256 different possible intensities, and so the histogram can be graphically displayed as 256 numbers showing the distribution of pixels amongst those grayscale values (or alternatively generate an array of 256 elements, where each array element corresponds to a pixel intensity value and the value of each element represents the number of pixels in input image that have element's corresponding pixel intensity value). Histograms can also be taken of color images—either individual histograms of red, green and blue channels can be taken, or a 3-D histogram can be produced, with the three axes representing the red, blue and green channels, and brightness at each point representing the pixel count. The exact output from the operation depends upon the implementation—it may simply be a picture of the required histogram in a suitable image format, or it may be a data file of some sort representing the histogram statistics (such as the array mentioned above). The image is scanned in a single pass and a running count of the number of pixels found at each intensity value is kept. This is then used to construct a suitable histogram. Intensity histograms can also be generated by assigning multiple intensity values to a single histogram bin. For example, an image with $2^{12}$ possible intensity values can be histogrammed with 256 bins, where each bin contains a set of adjacent intensity values. For the purposes of this description, the input image is assumed to be operated on as a grayscale image. However, a person having ordinary skill in the art will recognize that the principles described herein enable implementation with a color image without undue experimentation.

Cumulative Distribution Function

A cumulative distribution function ('CDF') of pixel intensity values of an image is comprised of a collection of discrete CDF values associated with a pixel intensity value, where a CDF value of a corresponding pixel intensity value represents the probability that a pixel in the image will have a pixel intensity value less than or equal to the CDF value's associated pixel intensity value. For example, consider the 3×3 image represented below as a set formed of 9 pixel intensity value entries (where each pixel intensity value entry corresponds to the pixel intensity value of its corresponding pixel) having possible pixel values of 1, 2, 3, 4, or 5.

$$\begin{bmatrix} 3 & 2 & 1 \\ 1 & 3 & 3 \\ 5 & 2 & 1 \end{bmatrix}$$

Here, the cumulative distribution function of the pixel intensity values of the exemplary 3×3 image would be discretely represented in tabular form in Table 1.

TABLE 1

| Pixel Intensity Value | CDF Value |
|---|---|
| 1 | 1/3 |
| 2 | 5/9 |
| 3 | 8/9 |
| 5 | 1 |

In the above example, pixel intensity value of 1 has an associated CDF value of ⅓, pixel intensity value of 2 has a CDF value of 5/9, pixel intensity value of 3 has a CDF value of 8/9, and pixel intensity value of 5 has a CDF value of 1. As pixel intensity value of 4 is not present in the exemplary 3×3 image, it is not considered to be part of the CDF of the exemplary 3×3 input image even though it is a possible intensity value.

EMBODIMENTS

Embodiments will now be described with reference to the definitions and notation introduced above using an illustrative 10×10 input image having arbitrarily assigned pixel intensity values as illustrated in FIG. 2. The illustrative input image is treated as a 9 bit grayscale image with a possible range of values from, and including, 0 to 511 to illustrate the principles of the invention. Though the illustrative input image illustrates a 10×10 image with arbitrarily assigned grayscale image intensity values ranging from 0 to 511, it is understood that the illustrative input image is used merely as an example, and input images having a different number of pixels, different pixel intensity values, different intensity value ranges, as well as color images, can be acted on according to principles of the invention.

Figure 3:
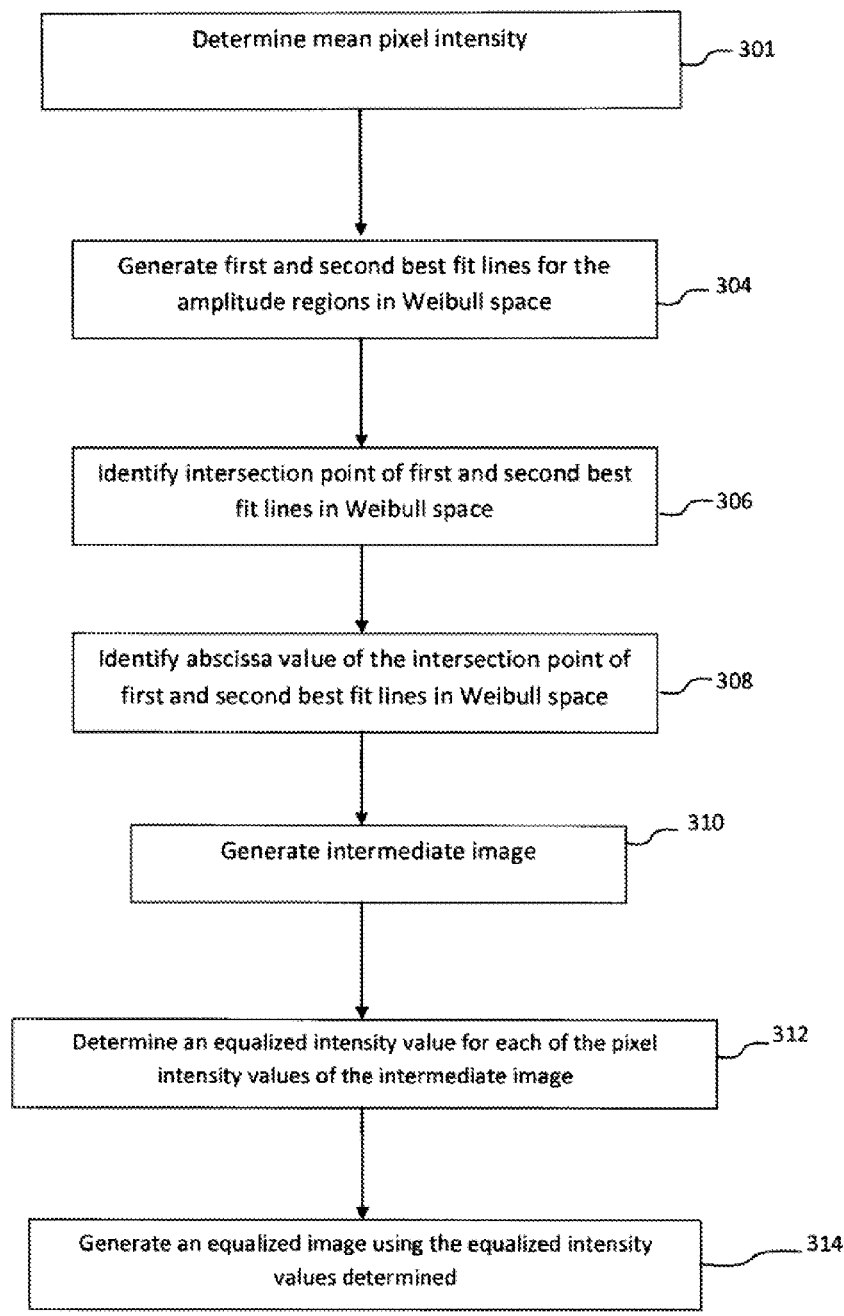
FIG. 3 is a block diagram illustrating process steps, generally stated instruction descriptions, and generally stated processor functions when executing the instructions, of some embodiments of the invention.

FIG. 3 is a flow-chart of a process performed according to principles of the invention and is used to describe the steps. Turning to the operational description, embodiments include providing or receiving an input image of an input image as defined above.

With reference to FIG. 3, embodiments include determining mean pixel intensity value of pixels in input image from pixel intensity value information of the input image 301. Using the illustrative image with pixel intensity values as illustrated in FIG. 2, the mean pixel intensity value of the pixels in the example input image is) 14.24.

With reference to FIG. 3, embodiments further include generating a first best line fit for a selected first amplitude region of a cumulative distribution function (of the intensity values of the plurality of pixels) mapped in Weibull space and generating a second line fit for a selected second amplitude region of the cumulative distribution function (of the intensity values of the plurality of pixels) mapped in the Weibull space 304. Each of the first and second amplitude regions is a portion (or region) of the cumulative distribution function of the intensity values of the pixels of the input image (the CDF of the pixel intensity values of input image is notationally referred to herein as "$CDF_{input}$"). First amplitude region does not overlap any part of second amplitude region. The amplitude regions are selected such that they are approximately linear when mapped in Weibull space. The amplitude regions can be determined by looking at examples of pixel intensity data of example images in Weibull space; over a large sampling of example images, two regions can be defined that robustly capture those two regions.

In some embodiments, first and second amplitude regions are defined as regions of $CDF_{input}$ within a pre-determined lower and upper percentage of $CDF_{input}$ values, respectively. In some of these embodiments, the highest valued pixel value—whose associated CDF value is equal to 1—is disregarded. Alternatively, these regions can be considered as regions of $CDF_{input}$ consisting of pixel intensity values that have a corresponding $CDF_{input}$ value less/greater than or equal to the lower or upper percentage (in some embodiments not including data for CDF=1), as applicable. Alternatively stated, in some embodiments, first amplitude region is the region of $CDF_{input}$ from the lowest pixel intensity value of the pixels in input image to a first pre-determined intensity value of at least one pixel in the input image, and the second amplitude region is defined as the region of $CDF_{input}$ from a second pre-determined intensity value to the next to highest intensity value of the pixels in input image, where second pre-determined intensity value is greater than first pre-determined intensity value. The remainder of this specification uses arbitrarily selected first and second amplitude regions to illustrate embodiments wherein the first amplitude region is defined as consisting of pixel intensity values (of pixels in illustrative input image) that have a corresponding $CDF_{input}$ value less than or equal to 0.47 (alternatively stated as the lowest 47%) and the second amplitude region is defined as consisting of amplitudes of pixel intensity values (of pixels in illustrative input image) that have a corresponding $CDF_{input}$ value greater than or equal to 0.97 and less than 1.00 (thereby effectively disregarding the largest amplitude—510). However, it is emphasized that other amplitude regions can be selected and implemented without deviating from principles of the invention(s). Using the arbitrarily selected amplitude regions, for the illustrative input image in FIG. 2, the amplitudes of pixel intensity values within the first and second amplitude regions are, respectively: [10 15 20 29 37 40 42 45 49 51 55 56 58 59 61 69 71 72 76 77 78 79 81 83 84 85 86 90 91 92 97 98 101 102] and [300 400 500]. In this case, 'first pre-determined intensity value' would be equal to 102 and 'second pre-determined intensity value' would be equal to 300.

Generating best line fits of the two amplitude regions of the cumulative distribution of the pixel intensity values in Weibull space can be performed using any conventional method. Two methods are identified herein—a first method described with respect to FIG. 4 and a second method described with reference to pseudo-code presented infra. We now turn to a description of two methods of generating the best line fits.

Figure 4:
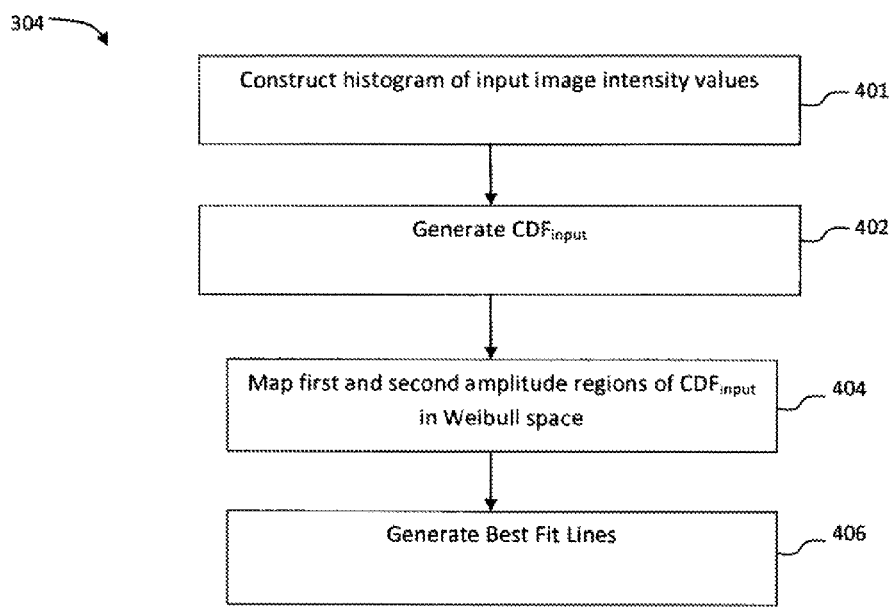
FIG. 4 is a block diagram illustrating a process to generate best line fits for the first and second amplitude regions in some embodiments.

With reference to FIG. 4, in some embodiments, the generating a first and second line fit step 304 includes constructing a pixel intensity value histogram of the input image using any conventional technique 401. This first intensity value histogram is a sorted (from least pixel intensity value to greatest) array of data elements, where each array element corresponds to a pixel intensity value and represents the number of pixels in input image that have the element's corresponding pixel intensity value.

Embodiments further include generating a cumulative distribution function of the pixel intensity values of the input image 402. The output of this step is a data file describing the $CDF_{input}$ of the input image, and it may be an array, matrix, or vector, or other conventional representation depending on the program specifics used to implement the $CDF_{input}$. The $CDF_{input}$ of the illustrative input image is provided in tabular form in Table 2.

TABLE 2

| PIV | CDF Value |
|---|---|
| 10 | 0.01 |
| 15 | 0.02 |
| 20 | 0.04 |
| 29 | 0.06 |
| 37 | 0.07 |
| 40 | 0.09 |
| 42 | 0.10 |
| 45 | 0.11 |
| 49 | 0.12 |
| 51 | 0.13 |
| 55 | 0.14 |
| 56 | 0.16 |
| 58 | 0.17 |
| 59 | 0.18 |
| 61 | 0.20 |
| 69 | 0.22 |
| 71 | 0.23 |
| 72 | 0.24 |
| 76 | 0.25 |
| 77 | 0.26 |
| 78 | 0.27 |
| 79 | 0.28 |
| 81 | 0.29 |
| 83 | 0.31 |
| 84 | 0.32 |
| 85 | 0.35 |
| 86 | 0.37 |
| 90 | 0.39 |
| 91 | 0.40 |
| 92 | 0.41 |
| 97 | 0.44 |
| 98 | 0.45 |
| 101 | 0.46 |
| 102 | 0.47 |
| 104 | 0.49 |
| 105 | 0.50 |
| 107 | 0.51 |
| 108 | 0.52 |
| 109 | 0.53 |
| 111 | 0.54 |
| 112 | 0.55 |
| 114 | 0.56 |
| 115 | 0.58 |
| 116 | 0.59 |
| 117 | 0.60 |
| 118 | 0.61 |
| 119 | 0.62 |
| 121 | 0.63 |
| 122 | 0.64 |
| 123 | 0.67 |
| 124 | 0.68 |
| 125 | 0.70 |
| 126 | 0.71 |
| 127 | 0.73 |
| 128 | 0.74 |

TABLE 2-continued

| PIV | CDF Value |
|---|---|
| 131 | 0.75 |
| 132 | 0.76 |
| 137 | 0.77 |
| 141 | 0.78 |
| 142 | 0.79 |
| 143 | 0.80 |
| 146 | 0.81 |
| 147 | 0.82 |
| 151 | 0.84 |
| 152 | 0.85 |
| 153 | 0.86 |
| 161 | 0.87 |
| 166 | 0.88 |
| 167 | 0.89 |
| 169 | 0.90 |
| 172 | 0.91 |
| 174 | 0.92 |
| 176 | 0.93 |
| 183 | 0.94 |
| 186 | 0.95 |
| 187 | 0.96 |
| 300 | 0.97 |
| 400 | 0.98 |
| 500 | 0.99 |
| 510 | 1.00 |

Table 3 provides a table of an example compilation of pixel intensity values of the illustrative input image that fall within the illustrative first amplitude region of the $CDF_{input}$ of illustrative input image.

TABLE 3

| PIV | CDF Value | PIV | CDF Value |
|---|---|---|---|
| 10 | 0.01 | 72 | 0.24 |
| 15 | 0.02 | 76 | 0.25 |
| 20 | 0.04 | 77 | 0.25 |
| 29 | 0.05 | 78 | 0.27 |
| 37 | 0.07 | 79 | 0.28 |
| 40 | 0.09 | 81 | 0.29 |
| 42 | 0.10 | 83 | 0.31 |
| 45 | 0.11 | 84 | 0.32 |
| 49 | 0.12 | 85 | 0.35 |
| 51 | 0.13 | 86 | 0.37 |
| 55 | 0.14 | 90 | 0.39 |
| 56 | 0.16 | 91 | 0.40 |
| 58 | 0.17 | 92 | 0.41 |
| 59 | 0.18 | 97 | 0.44 |
| 51 | 0.20 | 98 | 0.45 |
| 69 | 0.22 | 101 | 0.46 |
| 71 | 0.23 | 102 | 0.47 |

Table 4 provides a table of an example compilation of pixel intensity values of the illustrative input image that fall within the illustrative second amplitude region of the $CDF_{input}$ of the illustrative input image.

TABLE 4

| PIV | CDF Value |
|---|---|
| 300 | 0.97 |
| 400 | 0.99 |
| 500 | 0.99 |

As a lexicographical note, for the purposes of this application, a CDF is mapped in Weibull space when the values of the CDF are related to axis values of a Weibull plot. A Weibull plot is defined herein as a plot of the CDF data on special axes in a type of Q-Q plot. The axes of a Weibull plot are defined in Equations 1 and 2 for the ordinate and abscissa axes, respectively, where 'ln' represents the natural logarithm and 'x' represents a pixel intensity value.

$$\ln(-\ln(1-CDF(x))) \qquad \text{Equation 1}$$

$$\ln(x) \qquad \text{Equation 2}$$

If the data intensity values of the image are perfectly described by Weibull distribution, then a plot of the intensity values in Weibull space (on a Weibull plot) will produce a straight line.

Figure 5:
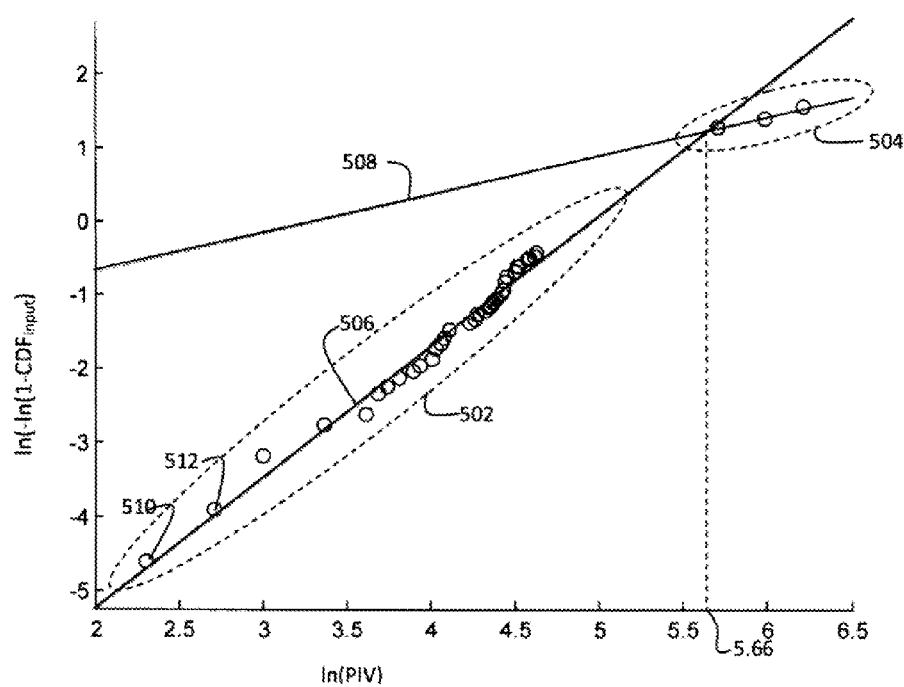
FIG. 5 is a graph (in the form of a scatter plot) of illustrative first and second amplitude regions of the illustrative cumulative distribution function (of the pixel intensities of the illustrative image of FIG. 2) in Weibull space. The ovals designate amplitude regions according to illustratively defined amplitude regions.

In these embodiments, with reference to FIG. 4, each of the amplitude regions of $CDF_{input}$ is mapped into "Weibull space" 404. FIG. 5 illustrates the illustrative amplitude regions for the illustrative image as plotted in Weibull space in the form of a scatter plot, with the points in oval 502 representing the intensity values of input image pixels that fall within the illustrative first amplitude region, and the points in oval 504 representing the intensity values of input image pixels that fall within the illustrative second amplitude region. 510 in FIG. 5 represents the mapping of a pixel intensity value of '10' (of the cumulative distribution function for the illustrative image) in Weibull space, while 512 represents the mapping of pixel intensity value of '15'.

With reference to FIG. 4, in these embodiments, the last step of this sub-process includes determining a first best line of first amplitude region of $CDF_{input}$ in Weibull space and a second best fit line of second amplitude region of $CDF_{input}$ in Weibull space by electronically fitting a first best fit line to the first amplitude region when mapped into Weibull space (plotted on a Weibull plot), and electronically fitting a second best fit line to the pixel intensity entries of the second amplitude region when mapped into Weibull space (plotted on the Weibull plot) 406. Lines 506 and 508 represent the first and second line fits for the first and second amplitude regions, respectively. This can be done using any conventional technique, including conventional techniques for implementing least squares best fit lines.

In other embodiments, the generating a best line fit for an amplitude region of $CDF_{input}$ in Weibull space (block 304 in FIG. 3) is accomplished using software coded according to the following pseudocode:

```
For(i=0;i<numberOfPixels;i++)
    Pp[i]=i/numberOfPixels;
For(i=start;i<end;i++)
    Xx[i-start]=ln(sorteddata(i));
    Yy[i-start]=ln(-ln(1-Pp[i]));
For(i=0;i<numberOfPixels;i++)
    Sx1+=Xx[i];
    Sxx+=Xx[i]*Xx[i];
    Sxy+=Xx[i]*Yy[i];
    Sy1+=Yy[i];
Dd=numberOfPixels*Sxx-Sx1*Sx1;
yIntercept=(Sxx*Sy1-Sxy*Sx1)/Dd;
slope=(numberOfPixels*Sxy-Sx1*Sy1)/Dd;
xIntercept=e^(-yIntercept/slope);
```

The pseudo code describes how to code to generate the best line fits for a given amplitude region. The code would be repeated or adapted (using conventional techniques) to solve for best fit lines for each of the amplitude regions. Explanation of the pseudo code during the remainder of this paragraph is directed to a pseudo code instantiation that is adapted to generate a best line fit for the illustrative first amplitude region. The variable 'numberofpixels' identifies the number of the plurality of pixels in the input image (in the case of the illustrative input image, this is 100). The variable 'sorteddata' is a sorted list of intensity values of the pixels in the input image. $CDF_{input}$ is the relation (sorteddata(i),Pp(i)). In some embodiments, 'sorteddata' takes the form of an array. FIG. 6 illustrates an example 'sorteddata' array populated by the sorted intensity values of the illustrative input image. 'Start amplitude' and 'End amplitude' as used herein identify the lowest and highest intensity values, respectively, of the amplitude region for which a line fit is being generated. As the pseudo code is being described with respect to the illustrative first amplitude region, the 'Start amplitude' would be 0, while the 'End amplitude' would be 102. 'Start' is the position of the data element in the 'sorteddata' array comprising the beginning of the amplitude region in histogram space (the position of the first array element in 'sorteddata' that has the value of 'Start amplitude'). 'End' is the position of the data element in the 'sorteddata' array comprising the end of the amplitude region in histogram space (the position of the last array element in sorteddata that has the value of 'End amplitude'). The result of this instantiation of pseudo code is the y-intercept and slope of the best fit line for the first amplitude region.

Once the best fit lines for the first and second amplitude regions have been generated, embodiments further include identifying the intersection point of the first and second best fit lines in Weibull space and identifying the abscissa value of that intersection point in Weibull space. This is performed using any conventional means. As a lexicographical note, the abscissa value of the intersection point of the first and second best fit lines is referred to herein as an image's "abscissa value". FIG. 5 illustrates first and second best fit lines for each of the amplitude regions, along with the intersection point and abscissa value (5.66) for the illustrative image.

With reference to FIG. 3, once the abscissa value is determined, embodiments generate an intermediate image (block 310) by:
  generating intermediate updated intensity values of the pixels of the plurality of pixels that have an intensity value lower than the value of the mean intensity value rounded down to the nearest possible intensity value (the 'rounded mean intensity value') by assigning each of the plurality of pixels of input image having an intensity value lower than the rounded mean intensity value a value equal to the value of the possible intensity values that sequentially immediately precedes the rounded mean intensity value when the possible pixel intensity values are sorted from least to greatest;
  generating intermediate updated intensity values of the pixels of the plurality of pixels having an intensity value greater than the value of the exponential of the abscissa value rounded up to the nearest possible intensity value (the 'rounded exponential of the abscissa value') by assigning each of the pixels having an intensity value greater than the rounded exponential of the abscissa value a value equal to the value of the possible intensity values that sequentially immediately follows the rounded mean intensity value when the possible pixel intensity values are sorted from least to greatest; and
  generating intermediate updated intensity values of all remaining pixels by assigning all the remaining pixels an intensity value equal to their original values (in some embodiments this is implemented by not updating the value of the remaining pixels)

In some embodiments, the output of the generating/updating steps (the 'intermediate image') is a data file containing the generated intermediate updated intensity values for each of the pixels in the input image (the collection of pixel intensity values of this intermediate image file is referred to as 'intermediate pixel intensity values'). This step would generate a data file where the pixels of input image are represented by their updated value, where updated, and their original value when not updated. Using the illustrative input image (where the mean intensity value is 114.24 and the exponential of the abscissa-value is 287.15), the rounded mean intensity value would be 114 and the rounded exponential of the abscissa value is 288. Using the illustrative data, the data file would contain data that describes a modified version of the 10×10 input image as is shown in FIG. 7, where the bolded values were updated in this step. In some embodiments, updating the intensity values results in the creation of an intermediate image formed of pixel values having updated intensity values.

With reference to FIG. 3, embodiments further include determining an equalized intensity value for each of the plurality of pixels in input image 310 according to Equation 3 (the equalization transfer function) where v represents an intermediate pixel intensity value, h(v) is the equalized intensity value corresponding to the intermediate pixel intensity value v, $CDF_{intermediate}(v)$ is the CDF value (of the cumulative distribution function of the intermediate pixel intensity values) of pixel intensity v, $CDF_{intermediate\_min}$ is the smallest CDF value of the cumulative distribution function of the intermediate intensity pixel values of the intermediate image, L is the number of gray levels of the input image, M is the number of rows in the input image, and N is the number of columns in the input image.

$$h(v) = \text{round}\left(\frac{CDF_{intermediate}(v) \times (M \times N) - CDF_{intermediate\_min} \times (M \times N)}{(M \times N) - CDF_{intermediate\_min} \times (M \times N)} \times (L-1)\right)$$ Equation 3

Table 5 provides a table of an example compilation of CDF values of $CDF_{intermediate}$ using the illustrative input image and corresponding regions and resulting intermediate intensity values.

TABLE 5

| PIV (Intermediate) | $CDF_{intermediate}$ Value | Equalized Value |
|---|---|---|
| 113 | 0.55 | 0 |
| 114 | 0.56 | 11 |
| 115 | 0.58 | 34 |
| 116 | 0.59 | 45 |
| 117 | 0.60 | 56 |
| 118 | 0.61 | 68 |
| 119 | 0.62 | 79 |
| 121 | 0.63 | 90 |
| 122 | 0.64 | 102 |
| 123 | 0.67 | 136 |
| 124 | 0.68 | 147 |
| 125 | 0.70 | 170 |
| 126 | 0.71 | 181 |
| 127 | 0.73 | 204 |
| 128 | 0.74 | 215 |
| 131 | 0.75 | 227 |
| 132 | 0.76 | 238 |
| 137 | 0.77 | 249 |
| 141 | 0.78 | 261 |
| 142 | 0.79 | 272 |
| 143 | 0.80 | 283 |
| 146 | 0.81 | 295 |
| 147 | 0.82 | 306 |
| 151 | 0.84 | 329 |
| 152 | 0.85 | 340 |
| 153 | 0.86 | 352 |
| 161 | 0.87 | 363 |
| 166 | 0.88 | 374 |
| 167 | 0.89 | 386 |
| 169 | 0.90 | 397 |
| 172 | 0.91 | 408 |

TABLE 5-continued

| PIV (Intermediate) | $CDF_{intermediate}$ Value | Equalized Value |
|---|---|---|
| 174 | 0.92 | 420 |
| 176 | 0.93 | 431 |
| 183 | 0.94 | 442 |
| 186 | 0.95 | 454 |
| 187 | 0.96 | 465 |
| 289 | 1.00 | 511 |

With reference to FIG. 2, using the illustrative image and associated values, the equalized intensity value for a pixel in input image having an intermediate pixel intensity value of 114 would be equal to 10 as is shown in Equation 5.

$$h(114) = \text{round}\left(\frac{56-55}{100-55} \times (512-1)\right) = 11 \quad \text{Equation 4}$$

With reference to FIG. 3, in some embodiments, step 312 is coded conventionally by generating a histogram array of the pixel intensity values of intermediate image, generating a cumulative sum array (a $CDF_{intermediate}(v)$ array), calculating the equalized value using the equalization transfer function of Equation 4, and storing the equalized value as a Look Up Table (LUT).

With reference to FIG. 3, embodiments further include generating an equalized image 314 by assigning each of the pixels of input image a final intensity value equal to the equalized intensity value of the pixel's intermediate pixel intensity value, thereby generating a data file defining a modified version of the input image wherein each constituent pixel is assigned an intensity value equal to its equalized intensity value. In some embodiments, this step is implemented using conventional techniques employing the LUT. The equalized image of illustrative input image in FIG. 2 is illustrated in FIG. 8.

While the Invention has been described, disclosed, illustrated and shown in various terms of certain embodiments or modifications, which it has presumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

What is claimed is:

1. A method for image equalization using an electronic processor, comprising:
    electronically determining a mean intensity value of a plurality of pixels of an input digital image having a plurality of possible pixel intensity values, wherein each of said plurality of pixels has an initial pixel intensity value;
    electronically generating a first line fit of a first amplitude region of a cumulative distribution function of said initial pixel intensity values of said plurality of pixels mapped in a Weibull space;
    electronically generating a second line fit of a second amplitude region of said cumulative distribution function of said initial pixel intensity values of said plurality of pixels mapped in said Weibull space;
    electronically determining an intersection point of said first line fit and said second line fit in said Weibull space;
    electronically determining an abscissa value of said Weibull space corresponding to said intersection point;
    electronically generating intermediate pixel intensity values for said plurality of pixels by:
        electronically generating intermediate intensity values of the pixels of said plurality of pixels that have an intensity value lower than said mean intensity value rounded down to a nearest rounded mean intensity value of said plurality of possible pixel intensity values by assigning each of said plurality of pixels having an intensity value lower than said nearest rounded mean intensity value a value equal to the value of said plurality of possible pixel intensity values that sequentially immediately precedes said nearest rounded mean intensity value when said plurality of possible pixel intensity values are sorted from least to greatest;
        electronically generating intermediate intensity values of the pixels of said plurality of pixels having an intensity value greater than a value of the exponential of said abscissa value rounded up to a nearest rounded exponential of said abscissa value of said plurality of possible pixel intensity values by assigning each of said plurality of pixels having an intensity value greater than said nearest rounded exponential of said abscissa value a value equal to the value of the possible intensity values that sequentially immediately follows said nearest rounded mean intensity value when said plurality of possible pixel intensity values are sorted from least to greatest; and
        electronically generating intermediate intensity values of all remaining pixels by assigning each of all other pixels of said plurality of pixels an intensity value equal to its said initial pixel intensity value;
    electronically determining an equalized intensity value for each of said plurality of pixels according to an equalization transfer function mathematically described in the following equation, where v represents said intermediate intensity values, $h(v)$ is the equalized intensity value corresponding to intermediate intensity value v, $CDF_{intermediate}(v)$ is a cumulative distribution function value of intermediate intensity value v, $CDF_{intermediate\_min}$ is the smallest CDF value of the cumulative distribution function of said intermediate intensity values, L is a number of gray levels in said input digital image, M is a number of rows in said input digital image, and N is a number of columns in said input digital image:

$$h(v) = \text{round}\left(\frac{CDF_{intermediate}(v) \times (M \times N) - CDF_{intermediate\_min} \times (M \times N)}{(M \times N) - CDF_{intermediate\_min} \times (M \times N)} \times (L-1)\right);$$

and
    electronically generating an equalized image by assigning each of said plurality of pixels a final intensity value equal to its corresponding said equalized intensity value.

2. The method of claim 1, wherein said input digital image is a RADAR image.

3. The method of claim 2, wherein said input digital image is an 8-bit grayscale image and wherein a number of said plurality of possible pixel intensity values is 256.

4. The method of claim 1, wherein said first amplitude region consists of pixel intensity values between and including a lowest pixel intensity value of said initial pixel intensity values and a first pre-determined intensity value, and wherein said second amplitude region consists of pixel intensity values between and including a second pre-determined intensity value and a next to greatest intensity value of said initial pixel intensity values, wherein said first pre-determined intensity value is less than said second pre-determined intensity value.

5. A non-transitory processor readable medium having stored thereon processor executable instructions that, when executed by said processor, cause said processor to:
   determine a mean intensity value of a plurality of pixels of an input digital image having a plurality of possible pixel intensity values, wherein each of said plurality of pixels has an initial pixel intensity value;
   generate a first line fit of a first amplitude region of a cumulative distribution function of said initial pixel intensity values of said plurality of pixels mapped in a Weibull space;
   generate a second line fit of a second amplitude region of said cumulative distribution function of said initial pixel intensity values of said plurality of pixels mapped in said Weibull space;
   determine an intersection point of said first line fit and said second line fit in said Weibull space;
   determine an abscissa value of said Weibull space corresponding to said intersection point;
   generate intermediate pixel intensity values for said plurality of pixels by:
   generate intermediate intensity values of the pixels of said plurality of pixels that have an intensity value lower than said mean intensity value rounded down to a nearest rounded mean intensity value of said plurality of possible pixel intensity values by assigning each of said plurality of pixels having an intensity value lower than said nearest rounded mean intensity value a value equal to the value of said plurality of possible pixel intensity values that sequentially immediately precedes said nearest rounded mean intensity value when said plurality of possible pixel intensity values are sorted from least to greatest;
   generate intermediate intensity values of the pixels of said plurality of pixels having an intensity value greater than a value of the exponential of said abscissa value rounded up to a nearest rounded exponential of said abscissa value of said plurality of possible pixel intensity values by assigning each of said plurality of pixels having an intensity value greater than said nearest rounded exponential of said abscissa value a value equal to the value of the possible intensity values that sequentially immediately follows said nearest rounded mean intensity value when said plurality of possible pixel intensity values are sorted from least to greatest; and
   generate intermediate intensity values of all remaining pixels by assigning each of all other pixels of said plurality of pixels an intensity value equal to its said initial pixel intensity value;
   determine an equalized intensity value for each of said plurality of pixels according to an equalization transfer function mathematically described in the following equation, where $v$ represents said intermediate intensity values, $h(v)$ is the equalized intensity value corresponding to intermediate intensity value $v$, $CDF_{intermediate}(v)$ is a cumulative distribution function value of intermediate intensity value $v$, $CDF_{intermediate\_min}$ is the smallest CDF value of the cumulative distribution function of said intermediate intensity values, $L$ is a number of gray levels in said input digital image, $M$ is a number of rows in said input digital image, and $N$ is a number of columns in said input digital image:

$$h(v) = \text{round}\left(\frac{CDF_{intermediate}(v) \times (M \times N) - CDF_{intermediate\_min} \times (M \times N)}{(M \times N) - CDF_{intermediate\_min} \times (M \times N)} \times (L-1)\right);$$

and
   generate an equalized image by assigning each of said plurality of pixels a final intensity value equal to its corresponding said equalized intensity value.

6. The non-transitory processor-readable medium of claim 4 wherein said digital image is a RADAR image.

7. The non-transitory processor-readable medium of claim 4, wherein said input digital image is an 8-bit grayscale image and wherein a number of said plurality of possible pixel intensity values is 256.

8. The non-transitory processor-readable medium of claim 4, wherein said first amplitude region consists of pixel intensity values between and including a lowest pixel intensity value of said initial pixel intensity values and a first pre-determined intensity value, and wherein said second amplitude region consists of pixel intensity values between and including a second pre-determined intensity value and a next to greatest intensity value of said initial pixel intensity values, wherein said first pre-determined intensity value is less than said second pre-determined intensity value.

* * * * *